(12) United States Patent
Chan et al.

(10) Patent No.: US 12,730,420 B2
(45) Date of Patent: Sep. 8, 2026

(54) SOFTWARE ROBOT ORCHESTRATION ENGINE

(71) Applicant: International Business Machines Corporation, Armonk, NY (US)

(72) Inventors: Allen Vi Cuong Chan, Markham (CA); Sebastian Carbajales, Mississauga (CA); Yazan Obeidi, Markham (CA); Edward Michael Lynch, Toronto (CA); Salman Saleem Sheikh, Sanford, FL (US); John Henry Green, Toronto (CA); Zachary A. Silverstein, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 435 days.

(21) Appl. No.: 18/209,592

(22) Filed: Jun. 14, 2023

(65) Prior Publication Data

US 2024/0419130 A1 Dec. 19, 2024

(51) Int. Cl.
*G05B 13/02* (2006.01)

(52) U.S. Cl.
CPC .................... *G05B 13/0265* (2013.01); *G05B 2219/50391* (2013.01)

(58) Field of Classification Search
CPC ...... G05B 13/0265; G05B 2219/50391; G06N 20/00; G06F 9/4843
See application file for complete search history.

(56) References Cited

U.S. PATENT DOCUMENTS

| | | | |
|---|---|---|---|
| 10,839,404 B2 | 11/2020 | Ramamurthy et al. | |
| 11,146,598 B1 | 10/2021 | Palihakkara et al. | |
| 11,537,416 B1 * | 12/2022 | Ganesan | G06F 11/3438 |
| 2020/0180148 A1 | 6/2020 | S Nanal et al. | |
| 2020/0327430 A1 * | 10/2020 | Martinez | B25J 9/163 |

(Continued)

FOREIGN PATENT DOCUMENTS

| | | |
|---|---|---|
| WO | 2020229843 A1 | 11/2020 |
| WO | 2024/256193 A1 | 12/2024 |

OTHER PUBLICATIONS

McGloin, RPA Use Cases and Chatbots: How the Combination Boosts Experience and the Bottom Line, 2023, https://servisbot.com/chatbots-rpa-use-cases/.

(Continued)

*Primary Examiner* — Charles R Kasenge
(74) *Attorney, Agent, or Firm* — Steven M. Bouknight

(57) ABSTRACT

An embodiment configures a software robot to operate collaboratively with a plurality of platforms within a work environment. The embodiment decomposes, via the software robot, a request to perform a task received from one of the platforms, into at least one integration-action pair. An integration in this pair represents a configuration to operate on an execution platform within the plurality of platforms where a function is to be executed; an action in the pair represents the function to be performed on the execution platform. Responsive to the determination that the at least one integration-action pair does not exist in a database of integration-action pairs, the embodiment trains the software robot to perform the function on the platform.

17 Claims, 9 Drawing Sheets

(56) References Cited

U.S. PATENT DOCUMENTS

| | | | |
|---|---|---|---|
| 2021/0110300 | A1 | 4/2021 | Singh et al. |
| 2021/0117895 | A1 | 4/2021 | Tondevold et al. |
| 2021/0144110 | A1 | 5/2021 | Tseng et al. |
| 2022/0019195 | A1 | 1/2022 | Yu et al. |
| 2022/0164200 | A1 | 5/2022 | Ganhotra et al. |

OTHER PUBLICATIONS

Microsoft, Skills overview, Nov. 29, 2022, https://learn.microsoft.com/en-us/azure/bot-service/skills-conceptual?view=azure-bot-service-4.0.

Liveperson, Bot-to-Bot Transfers, May 17, 2023, https://developers.liveperson.com/conversation-builder-bots-bot-to-bot-transfers.html.

International Searching Authority, PCT/EP2024/065064, Jul. 23, 2024.

* cited by examiner

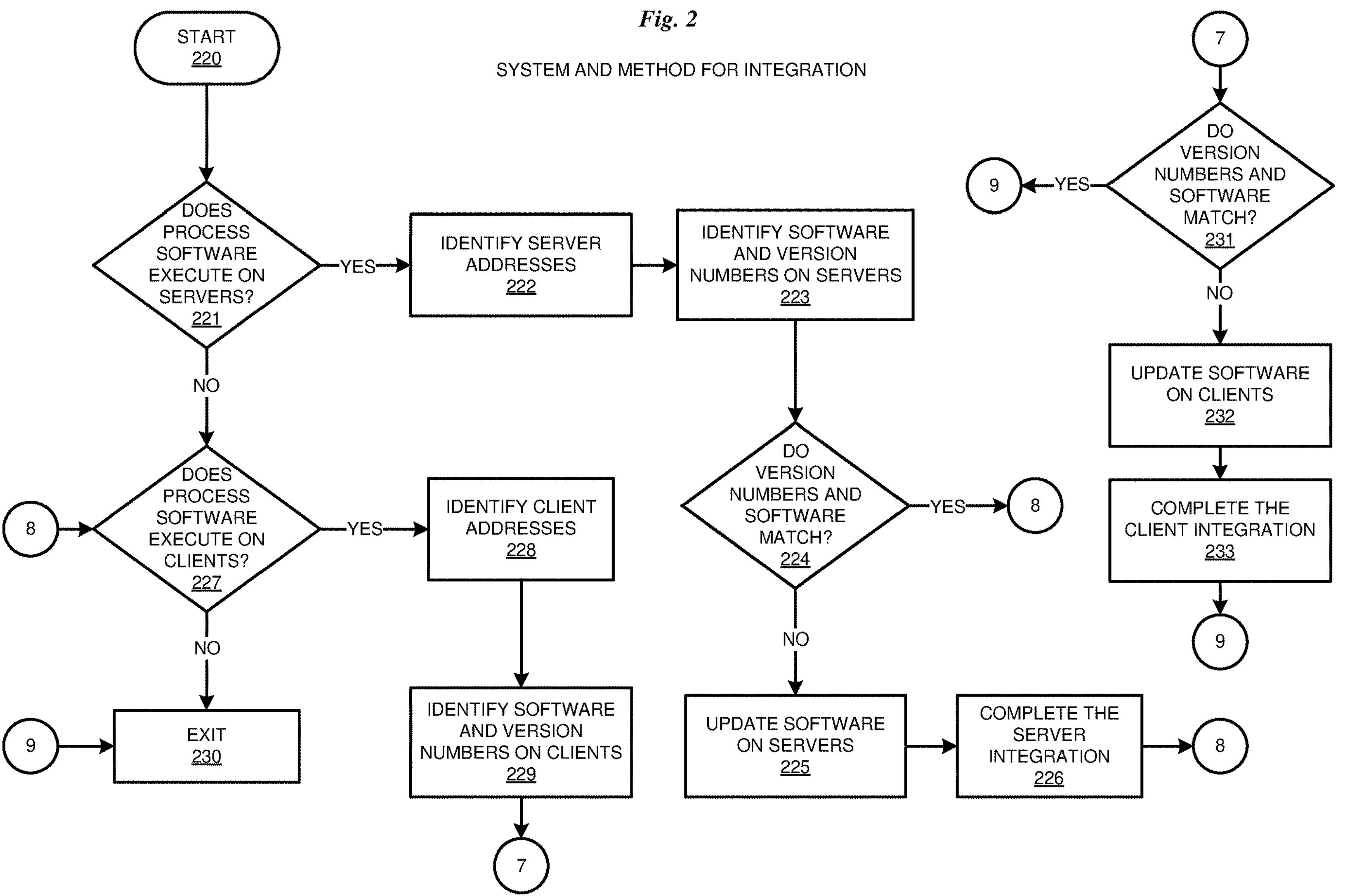
Fig. 2
SYSTEM AND METHOD FOR INTEGRATION
START 220
DOES PROCESS SOFTWARE EXECUTE ON SERVERS? 221
YES
NO
IDENTIFY SERVER ADDRESSES 222
IDENTIFY SOFTWARE AND VERSION NUMBERS ON SERVERS 223
DO VERSION NUMBERS AND SOFTWARE MATCH? 224
YES
NO
8
UPDATE SOFTWARE ON SERVERS 225
COMPLETE THE SERVER INTEGRATION 226
8
DOES PROCESS SOFTWARE EXECUTE ON CLIENTS? 227
YES
NO
8
IDENTIFY CLIENT ADDRESSES 228
IDENTIFY SOFTWARE AND VERSION NUMBERS ON CLIENTS 229
7
EXIT 230
9
7
DO VERSION NUMBERS AND SOFTWARE MATCH? 231
YES
NO
9
UPDATE SOFTWARE ON CLIENTS 232
COMPLETE THE CLIENT INTEGRATION 233
9

*Fig. 3*

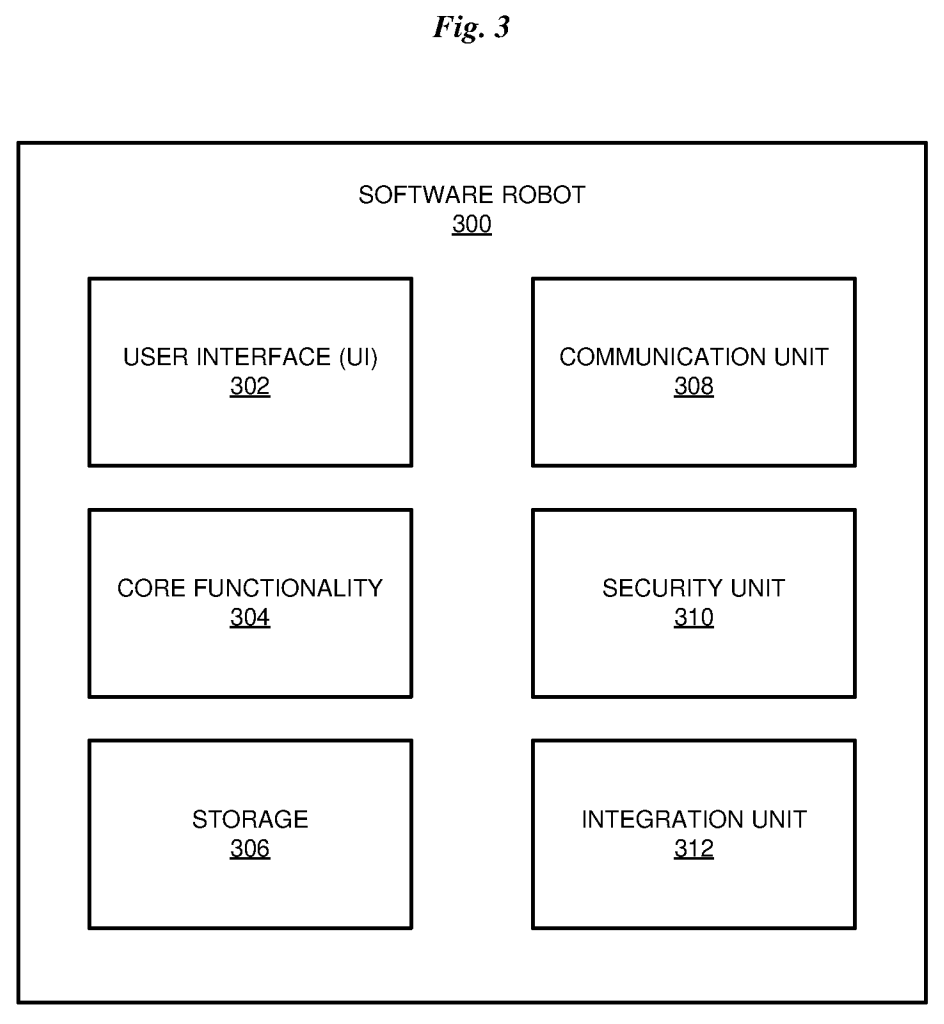

SOFTWARE ROBOT 300

USER INTERFACE (UI) 302

COMMUNICATION UNIT 308

CORE FUNCTIONALITY 304

SECURITY UNIT 310

STORAGE 306

INTEGRATION UNIT 312

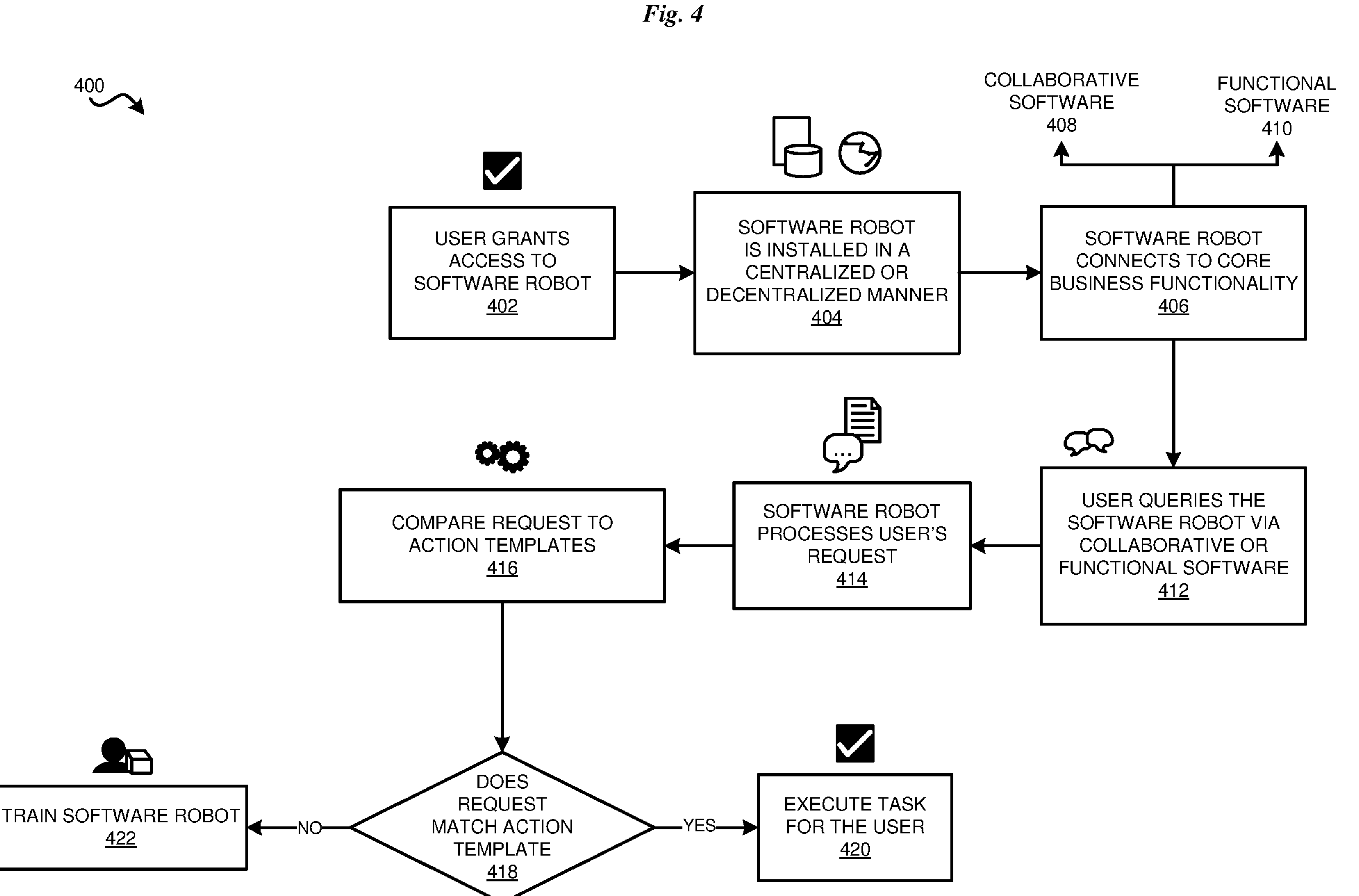
Fig. 4
400
USER GRANTS ACCESS TO SOFTWARE ROBOT 402
SOFTWARE ROBOT IS INSTALLED IN A CENTRALIZED OR DECENTRALIZED MANNER 404
SOFTWARE ROBOT CONNECTS TO CORE BUSINESS FUNCTIONALITY 406
COLLABORATIVE SOFTWARE 408
FUNCTIONAL SOFTWARE 410
USER QUERIES THE SOFTWARE ROBOT VIA COLLABORATIVE OR FUNCTIONAL SOFTWARE 412
SOFTWARE ROBOT PROCESSES USER'S REQUEST 414
COMPARE REQUEST TO ACTION TEMPLATES 416
DOES REQUEST MATCH ACTION TEMPLATE 418
YES
EXECUTE TASK FOR THE USER 420
NO
TRAIN SOFTWARE ROBOT 422

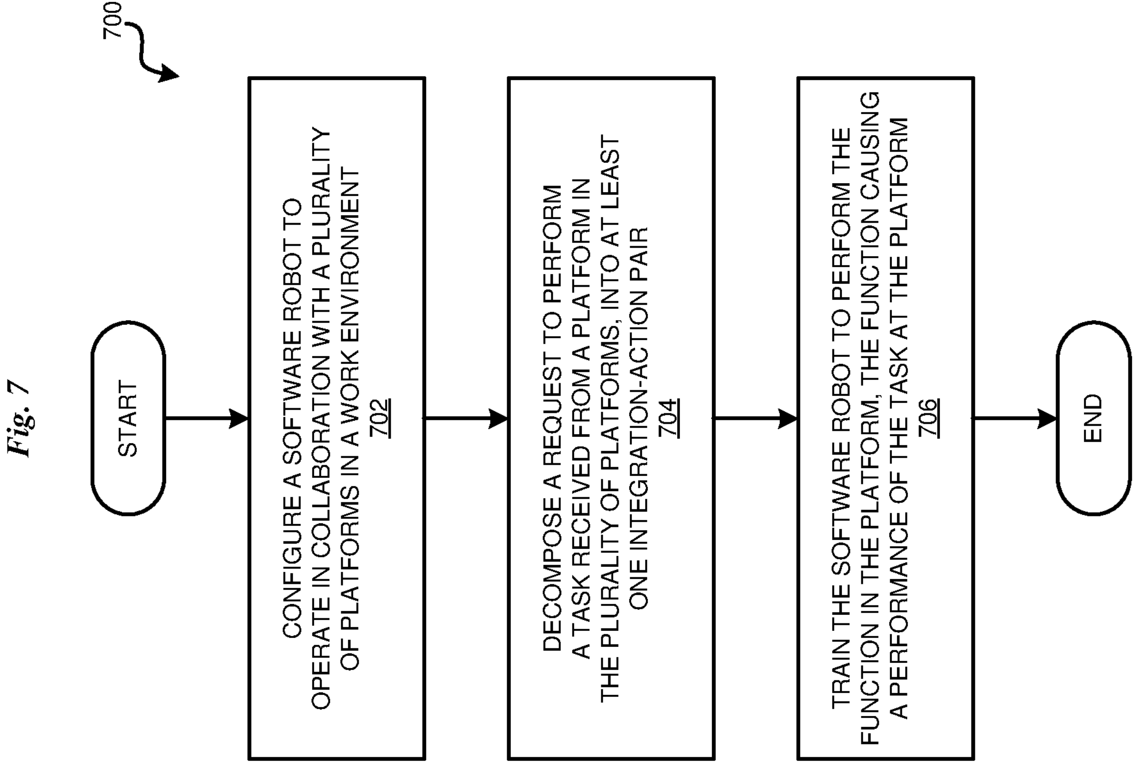
Fig. 7
700
START
CONFIGURE A SOFTWARE ROBOT TO OPERATE IN COLLABORATION WITH A PLURALITY OF PLATFORMS IN A WORK ENVIRONMENT
702
DECOMPOSE A REQUEST TO PERFORM A TASK RECEIVED FROM A PLATFORM IN THE PLURALITY OF PLATFORMS, INTO AT LEAST ONE INTEGRATION-ACTION PAIR
704
TRAIN THE SOFTWARE ROBOT TO PERFORM THE FUNCTION IN THE PLATFORM, THE FUNCTION CAUSING A PERFORMANCE OF THE TASK AT THE PLATFORM
706
END

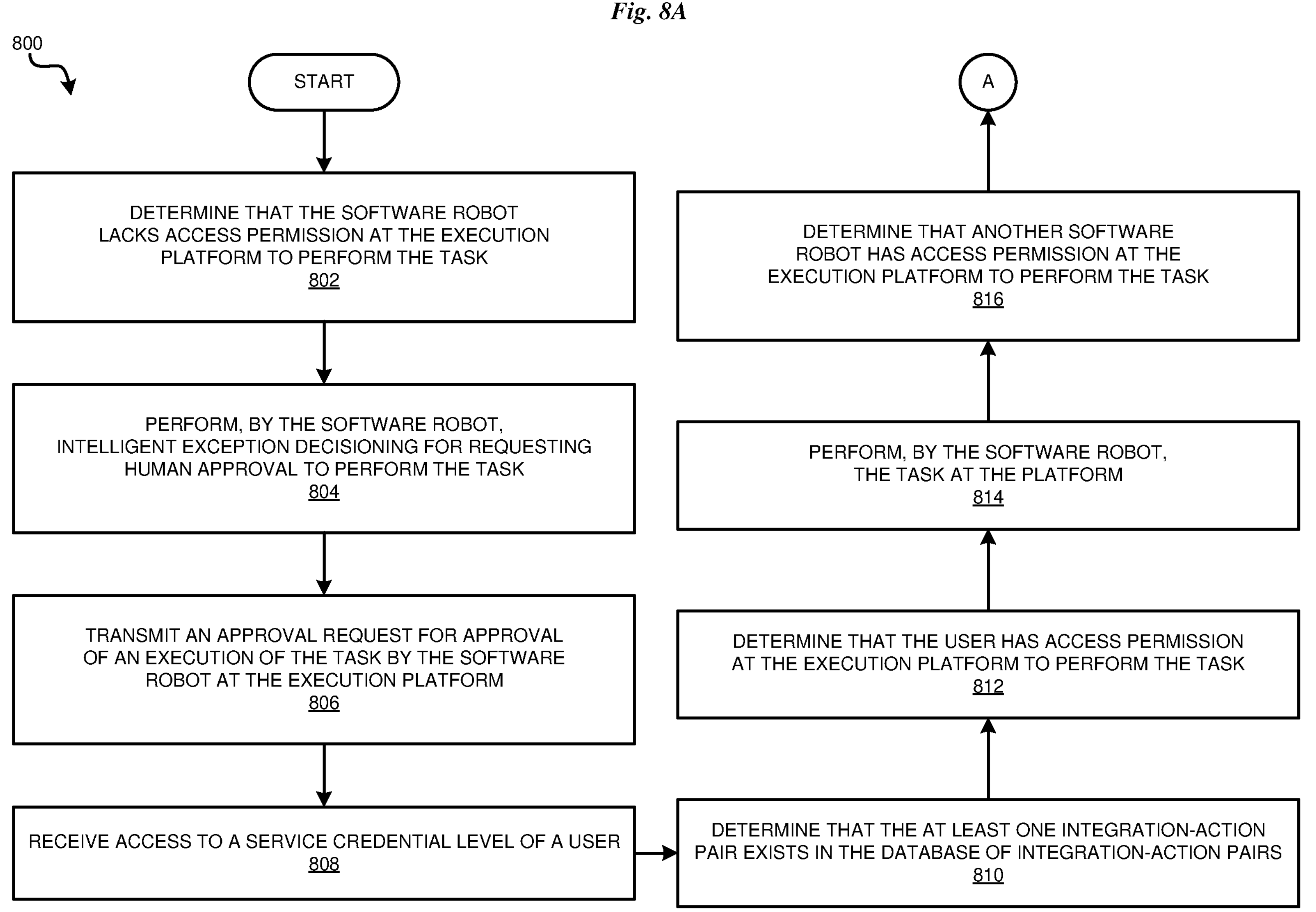

Fig. 8A
800
START
DETERMINE THAT THE SOFTWARE ROBOT LACKS ACCESS PERMISSION AT THE EXECUTION PLATFORM TO PERFORM THE TASK
802
PERFORM, BY THE SOFTWARE ROBOT, INTELLIGENT EXCEPTION DECISIONING FOR REQUESTING HUMAN APPROVAL TO PERFORM THE TASK
804
TRANSMIT AN APPROVAL REQUEST FOR APPROVAL OF AN EXECUTION OF THE TASK BY THE SOFTWARE ROBOT AT THE EXECUTION PLATFORM
806
RECEIVE ACCESS TO A SERVICE CREDENTIAL LEVEL OF A USER
808
DETERMINE THAT THE AT LEAST ONE INTEGRATION-ACTION PAIR EXISTS IN THE DATABASE OF INTEGRATION-ACTION PAIRS
810
DETERMINE THAT THE USER HAS ACCESS PERMISSION AT THE EXECUTION PLATFORM TO PERFORM THE TASK
812
PERFORM, BY THE SOFTWARE ROBOT, THE TASK AT THE PLATFORM
814
DETERMINE THAT ANOTHER SOFTWARE ROBOT HAS ACCESS PERMISSION AT THE EXECUTION PLATFORM TO PERFORM THE TASK
816
A

SOFTWARE ROBOT ORCHESTRATION ENGINE

BACKGROUND

The present invention relates generally to robotic processing automation. More particularly, the present invention relates to a method, system, and computer program for orchestrating software robots.

Robotic Process Automation (RPA) is a form of business process automation technology that uses software robots, or "bots," to automate repetitive, rule-based tasks. These tasks can range from simple functions such as copying and pasting data between applications, to more complex tasks like generating reports or processing transactions. RPA works by mimicking user actions in interacting with digital systems, following pre-defined rules to execute tasks. This automation may be achieved without altering existing infrastructures or systems, as the software robots interact with user interfaces in the same way as a user, which makes RPA a highly adaptable solution across diverse industries and business functions.

SUMMARY

The illustrative embodiments provide for orchestrating software robots. An embodiment includes configuring a software robot to operate in collaboration with a plurality of platforms in a work environment. Configuring a software robot to operate in collaboration with a plurality of platforms in a work environment provides the technical advantage of flexibility and interoperability. The software robot can interact with various platforms, broadening its utility and allowing it to handle a wide range of tasks across different systems.

The embodiment also includes decomposing, at the software robot, a request to perform a task received from a platform in the plurality of platforms, into at least one integration-action pair, where an integration in the integration-action pair is indicative of a configuration to operate on an execution platform in the plurality of platforms where a function is to be performed, and an action in the integration-action pair is indicative of the function to be performed in the execution platform. Decomposing a request to perform a task into at least one integration-action pair presents the technical advantage of task modularization. By breaking down tasks into smaller, manageable parts, the software robot can handle complex tasks more efficiently, and there's also potential for reusability of these integration-action pairs in different tasks.

The embodiment also includes training, responsive to a determination that the at least one integration-action pair does not exist in a database of integration-action pairs, the software robot to perform the function in the platform, the function causing a performance of the task at the platform. Training the software robot to perform the function in the platform provides the advantage of adaptability and learning capability. The software robot can learn new tasks and grow its capabilities, thereby improving its performance and reducing the need for manual intervention over time.

The overall technical effect of this process is a highly adaptable and versatile software robot. It is capable of seamlessly integrating with multiple platforms, handling a variety of tasks, and learning new tasks as necessary. The system's modularity and ability to learn new integration-action pairs enables it to continuously evolve, ultimately leading to increased automation and efficiency in the work environment. This results in significant time and cost savings, reduced manual errors, and improved productivity. Other embodiments of this aspect include corresponding computer systems, apparatus, and computer programs recorded on one or more computer storage devices, each configured to perform the actions of the embodiment.

An embodiment includes performing by the software robot, responsive to determining that the software robot lacks an access permission at the execution platform to perform the task, intelligent exception decisioning for performing an alternative task. Performing, by the software robot, intelligent exception decisioning for performing an alternative task provides the technical advantage of smart decision-making. The software robot can independently make informed choices when it encounters restrictions, which enhances its ability to complete tasks without human intervention.

An embodiment includes where performing intelligent exception decisioning includes transmitting, from the software robot to a manager of a user associated with the request, an approval request for approval of an execution of the task by the software robot at the execution platform. Transmitting, from the software robot to a manager of a user associated with the request, an approval request for approval of an execution of the task by the software robot at the execution platform provides the technical advantage of automated approval routing. This can streamline the process of task approval, reducing the need for manual communication and expediting task completion.

An embodiment includes receiving, by the software robot, access to a service credential level of a user. Receiving, by the software robot, access to a service credential level of a user offers the technical advantage of secure task performance. By accessing specific user credentials, the software robot can perform tasks within the appropriate access level, ensuring system security and data integrity.

The embodiment also includes performing by the software robot the task at the platform, responsive to a determination that the at least one integration-action pair exists in the database of integration-action pairs and a determination that the user has access permission at the execution platform to perform the task. Performing by the software robot the task at the platform in this manner provides the advantage of efficient task execution. The robot is equipped to perform tasks based on available actions and user access permissions, which enhances the robot's utility and maximizes efficiency.

An embodiment includes transmitting, responsive to a determination that another software robot has access permission at the execution platform to perform the task, an inter-software robot request from the software robot to the another software robot to perform the task. Transmitting an inter-software robot request from the software robot to another software robot to perform the task gives the advantage of collaborative automation. It facilitates sharing of tasks between robots, which can lead to better workload distribution and increased process efficiency.

An embodiment includes wherein decomposing the request into at least one integration-action pair involves performing natural language processing on the request. Performing natural language processing on the request to decompose it into integration-action pairs provides the advantage of language adaptability. This enables the robot to understand and act upon requests given in natural, human-like language, thereby enhancing usability.

An embodiment includes where training the software robot to perform the task includes obtaining execution instructions from user actions. Training the software robot to perform the task by obtaining execution instructions from user actions gives the advantage of user-guided learning. It allows the robot to learn directly from human behavior, enhancing its ability to mimic human actions and improve over time.

An embodiment includes decomposing, responsive to the training, the task into at least one new integration-action pair. The embodiment also includes adding the at least one new integration-action pair to the database of integration-action pairs. Decomposing, responsive to the training, the task into at least one new integration-action pair and adding the at least one new integration-action pair to the database of integration-action pairs provide the advantage of continuous learning and task modularization. This approach enables the robot to expand its knowledge base and improve its capability to handle new tasks.

An embodiment includes receiving by the software robot, responsive to an approval of an execution of the task, access to a second service credential level of a second user for the task. Receiving by the software robot, responsive to an approval of an execution of the task, access to a second service credential level of a second user for the task provides the advantage of secure multi-user task execution. This ensures the robot can work within different user access levels, enhancing its versatility and security.

The overall technical effect of these processes is an autonomous, intelligent software robot that is capable of smart decision-making, user-guided learning, secure multi-user task execution, and collaborative automation. Its ability to understand natural language requests, adapt to user behavior, and handle tasks across different platforms significantly enhances process efficiency and usability. This results in an automated work environment characterized by high productivity, improved security, and reduced need for manual intervention.

The embodiment that combines the elements of performing intelligent exception decisioning, transmitting an approval request, and receiving access to a service credential level of a user presents a unique system that ensures secure and efficient task execution by the software robot. When the robot lacks access permissions to perform a task at the execution platform, it makes a smart decision to request approval from a user's manager. Once approved, it receives the user's service credential level to perform the task. This combination of claims reflects an advantage of the invention: a software robot capable of autonomous operation, while maintaining the security and integrity of the system.

The technical effect of this claim combination includes improved system security and increased efficiency. The software robot's intelligent decision-making process ensures that tasks are not performed without appropriate permissions, enhancing security. Meanwhile, the automated approval request and subsequent task execution streamline the workflow, leading to increased efficiency.

Furthermore, the embodiment incorporating performing by the software robot the task at the platform, transmitting an inter-software robot request, and performing natural language processing on the request constitutes a versatile, collaborative, and user-friendly system. The robot efficiently performs tasks, collaborates with other robots when needed, and understands and acts upon requests given in natural language. This combination emphasizes an advantage of the invention to create a software robot that can perform tasks independently while also cooperating with other robots and easily interacting with humans.

This combination of claims leads to several technical effects and advantages. The collaborative aspect between robots allows for optimal task distribution, resulting in better process efficiency. The use of natural language processing makes the robot more adaptable and easy to use, as it can understand instructions given in everyday language.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 2 depicts a block diagram of an example software integration process in accordance with an illustrative embodiments.

FIG. 3 depicts a block diagram of an example software robot in accordance with an illustrative embodiment;

FIG. 4 depicts a block diagram of an example process for orchestration of software robots in accordance with an illustrative embodiment;

FIG. 7 depicts a block diagram of an example process for orchestration of software robots in accordance with an illustrative embodiment.

FIG. 8A depicts a block diagram of an example process for orchestration of software robots in accordance with an illustrative embodiment.

DETAILED DESCRIPTION

Figure 1:
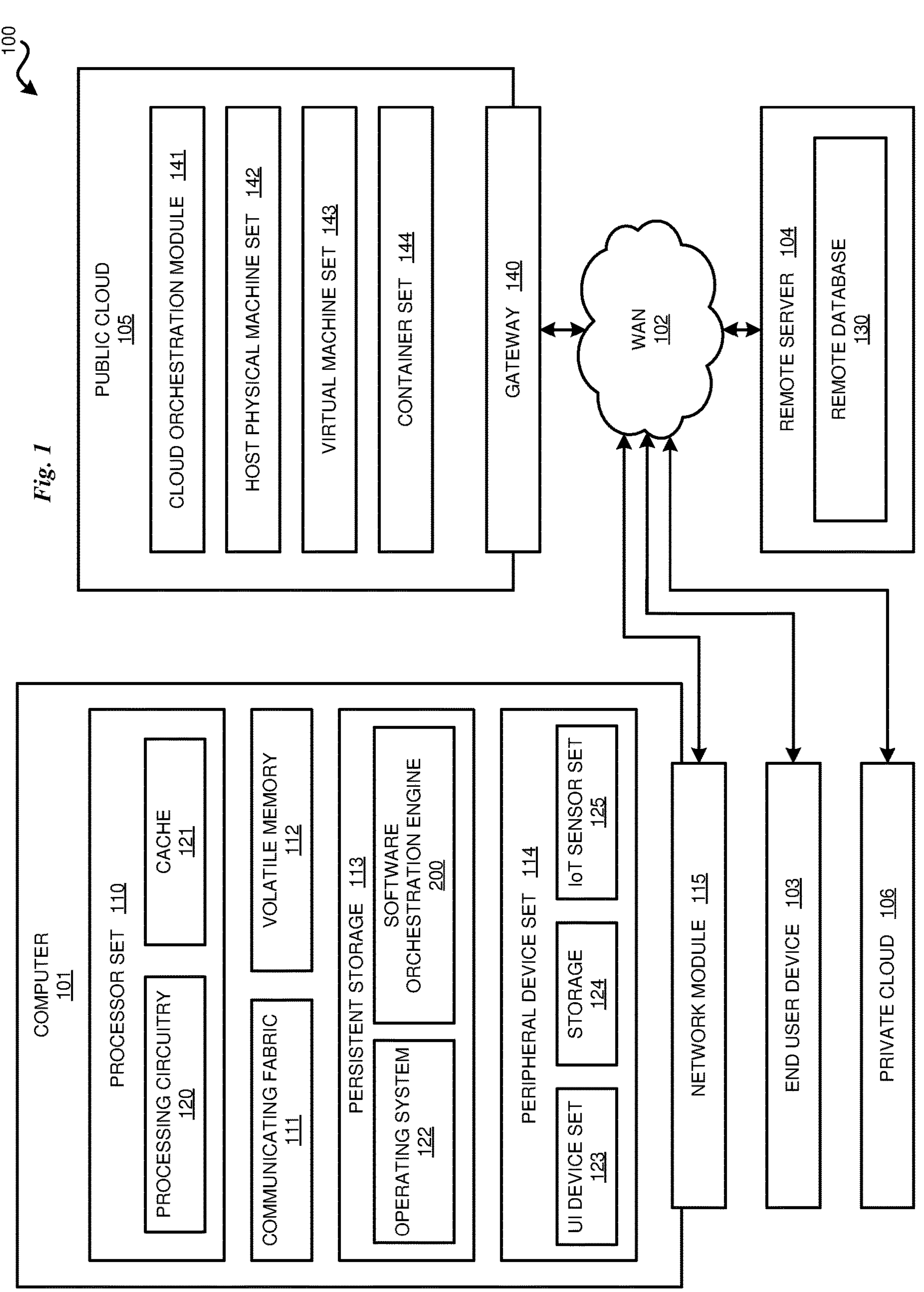
FIG. 1 depicts a block diagram of a computing environment in accordance with an illustrative embodiment.

The increasing interconnection of business systems and processes has underscored a pressing need for software robots to integrate seamlessly with one another. Businesses are relying more heavily on automated systems, and interconnected software robots offer a way to streamline operations and optimize efficiency. This growing dependency has been driven by the rapidly evolving digital landscape, creating an environment where software robots are no longer isolated entities, but integral components of a wider business infrastructure. The seamless integration of these software robots can facilitate complex business processes, allowing for real-time data sharing, instantaneous communication, and a high degree of process automation.

Furthermore, the enterprise need for simple task automation extends beyond just basic Robotic Process Automation (RPA). While RPA is instrumental in executing repetitive tasks, businesses are now seeking solutions that can handle more complex operations, requiring software robots to be more sophisticated and capable of handling multifaceted tasks. This shift indicates an increasing desire to automate more intricate processes, leading to greater operational efficiency and cost savings. This evolution in business automation has also paved the way for the development and deployment of intelligent automation tools that can learn, adapt, and respond to changing business environments.

Moreover, the classification of automation is frequently segmented into task automation and process automation. Task automation generally pertains to automating specific, repetitive tasks that consume unnecessary time and resources. Conversely, process automation involves automating an entire workflow or process, often comprised of multiple tasks in a sequence, providing a broader and more integrated approach to business automation. These classifications have been widely accepted as the standard way to categorize automation, focusing largely on the "what" is being automated.

However, when interacting with customers, their perception often diverges from these standard classifications. Customers tend to identify software robots not based on the tasks or processes they automate, but rather on the basis of whose role is being automated. They envision software robots as digital equivalents of user roles within their organization. This shift in perspective has practical implications, shifting the automation narrative from a process-centric to a persona-centric paradigm.

The present disclosure addresses the deficiencies described above by providing a process (as well as a system, method, machine-readable medium, etc.) that effectively automates and integrates software robots. This novel invention provides a streamlined, unified approach to complex task management and system functionality.

The illustrative embodiments provide for a software robot orchestration engine. "Software robot," as used herein, may refer to an automated program designed to perform tasks in a digital system or environment. These robots may interact with user interfaces, follow rule-based procedures, and/or handle repetitive tasks, among other things. "Orchestration," as used herein, may refer to the automated arrangement, coordination, and management of complex computer systems, services, and middleware. It may refer to both system administration and cloud computing, where it is used to automate and optimize the deployment, scaling, and management of large, complex systems. "Engine," as used herein, may refer to the component of a software system that drives and manages operations, which could include data processing, executing algorithms, controlling other elements within the system, or any other process.

In some embodiments, the software robot orchestration engine may deploy multiple software robots that possess the capabilities of executing tasks, as well as reading and writing state to systems. These software robots, acting as autonomous entities, may perform various operations, interact with different systems, and manage state information. This functionality may allow the software robots to effectively manage and monitor the state of tasks and systems, contributing to the overall efficiency and visibility of operations within the enterprise environment.

Illustrative embodiments include configuring a software robot to operate in collaboration with a plurality of platforms in a work environment. "Work environment," as used herein, may refer to a digital or physical setting where multiple individuals or systems work together to accomplish shared objectives. In a digital context, this may include tools and platforms that support real-time communication, document sharing, project management, and other cooperative activities. "Platform," as used herein, may refer to a digital environment or framework that provides a foundation on which software applications, processes, or services can operate. This can include operating systems, cloud computing environments, or software services that offer application programming interface (API) integrations. Configuring a software robot to operate in collaboration with a plurality of platforms in a work environment may include integrating a software robot or software robot into a system or application, such that it can interact with the system or application's interface, data, or functionality to perform tasks.

For example, the software robot may be designed to connect to Interactive Voice Response (IVR), Slack, Email, among others, to effectively handle requests and communications between individuals and the software robot. This interaction with various collaborative platforms may enable the software robot to receive and interpret a wide range of communication inputs, thereby understanding user requests and instructions more comprehensively. This level of connectivity may also allow the software robot to seamlessly integrate into the communication channels commonly used within an organization, thereby making its interactions more natural and user-friendly.

In some embodiments, the software robot may be configured to connect to multiple systems for communication, operating at either a centralized or decentralized level. This connectivity feature may enable the software robot to interact and integrate effectively within a complex business environment, potentially linking with a multitude of systems that are related to its tasks. At a centralized level, the software robot may connect to a central system or platform that integrates various functions and data sources, serving as a hub for its communications. Conversely, in a decentralized approach, the software robot may directly connect to multiple individual systems, gathering and processing information from each of these sources independently. Regardless of the level of operation, this multi-system connectivity may enable the software robot to have a broad reach within the organization, enhancing its capacity to collect, process, and communicate information across different platforms.

Additionally, in some embodiments, the software robot may utilize business context of an interacting user. This may involve the capability of the software robot to glean relevant context about a user's role, activities, or intentions from their interactions with the software robot or within the business environment, such as the nature of tasks they typically engage in, the kinds of requests they make, or the manner in which they use various business tools or platforms. This dynamic capability may allow the software robot to deliver more personalized and effective support, as it can tailor its actions to the specific context and needs of each user.

For instance, if a user interacts with the software robot with a specific request, such as seeking help to get their travel approved, the software robot may have the capability to comprehend the context and take appropriate action. Thus, the software robot may identify and use the user's business context to efficiently fulfill the user's request. In this case, the software robot, understanding the user's need for managerial approval, may be able to identify who the user's manager is. This knowledge could be based on a previous interaction, the user's role within the organization, or the hierarchical data available to the software robot, or any other available information. Having identified the manager, the software robot can then automatically forward the user's travel approval request to the manager.

Illustrative embodiments include receiving access to a service credential level of a user. "Service credential level," as used herein, may refer to the specific access permissions or authorizations associated with a service account in a system or application. These details may govern what actions the service account can perform within the system or application. Receiving access to service credential level may involve authorizing a user, system, or software robot to access or use the permissions or authorizations associated with a service account.

For example, in some embodiments, a software robot may be granted access natively through collaborative actions. For example, users may carbon copy (CC) a software robot in an email exchange. This inclusion in communication chains may allow the software robot to gain permissions and information necessary for its tasks. The software robot's access, thus obtained, can contribute to a more integrated and seamless operation within the enterprise environment, effectively merging the software robot's activities with the regular workflow of the business.

As another example, suppose a service account has access to a particular file. Following this, the service account, operating as a software robot, receives a message via a collaborative platform like Slack stating, "I just sent you a Box link of the files to enter in Datacap." The software robot, in this case, may be configured to process these two separate pieces of information—the granted file access and the received message—to carry out its function.

Moreover, in some embodiments, the software robot may receive accelerated permissions when a software robot is integrated into a time-sensitive action. This may mean that the software robot could gain access privileges more quickly than usual when it is involved in time-sensitive activities. For instance, this acceleration of permissions could be a consequence of the software robot's integration into the workflow, recognizing its collaborative role alongside human operators. Thus, the software robot's access and functionality can adapt swiftly to the evolving needs of the business operations.

Additionally, in some embodiments, the software robot may be configured to access enterprise platforms in a way that mimics individual human access. This could involve using techniques such as screen scraping, which involves the extraction of data displayed on the screen by the user interface of a software application. This type of access may allow the software robot to interact with platforms in the same way a user would, navigating through screens and pulling necessary information. By accessing these platforms, the software robot may be able to derive business context that guides its subsequent actions. This context could range from understanding a user's role or position within the organization, to deciphering the details of a particular task or process.

Illustrative embodiments include maintaining a state of the software robot across the plurality of platforms. A "state" of a software robot, as used herein, may refer to the current status or condition of a software robot at a given moment. This can include information about its authorizations or access, the tasks it is performing, the data it is processing, or the systems it is interacting with, among other things. Maintaining a state of a software robot may include keeping track of and updating the current status or condition of a software robot as it performs tasks, interacts with systems, or processes data.

For example, the software robot may retain its status, data, and context while transitioning across different communication and operation platforms, ensuring continuity and coherence in its operations. This feature may enhance the software robot's ability to function seamlessly within the enterprise, ultimately leading to more effective and integrated automation strategies.

Additionally, in some embodiments, the software robot may maintain its identity and the access restrictions associated with it. This may refer to the software robot's understanding of what actions it can or cannot perform based on the access privileges it has been granted or it possesses. This feature may enable the software robot to maintain a clear understanding of its capabilities and limitations within an environment. The software robot may actively utilize this information when interacting with individuals, enhancing its ability to provide appropriate responses and actions. This could involve informing the user about the tasks it can perform, making suggestions within its purview, or even explaining its limitations when a request goes beyond its granted access.

In some embodiments, state persistence may be achieved through a software robot's microserver. This may mean that the microserver associated with each software robot may store and manage the state of tasks and interactions. This level of individual state management may allow each software robot agent to independently track and maintain the status of its operations. This can lead to improved operational transparency and the ability to quickly recover or resume tasks in the event of interruptions or failures.

Additionally or alternatively, state persistence may be achieved through a centralized or cloud-based database that contains the relevant state of interactions and users. This may involve storing and managing state information in a centralized location, which can be accessed and updated by the software robot agents as needed. Such a setup may provide a comprehensive view of the state of operations across multiple software robot agents, facilitating more efficient resource allocation, and better overall management of the enterprise's automated operations. Moreover, a centralized or cloud-based database can also provide improved scalability and resilience, as it can be easily expanded or backed up as needed.

Illustrative embodiments include receiving, through a platform in a plurality of platforms, a request for a software robot to perform a particular task. A "request," as used herein, may refer to a user's or system's instruction or demand for a software robot to perform a certain task or operation. Receiving a request may involve receiving a request from a user or system to a software robot, such as in the form of digital communication like an API call or a message sent through a user interface such as email or Slack. A "task," as used herein, may refer to a specific operation, function, or action that a user, system, or software robot is to perform. This can range from simple operations like retrieving data from a database, to complex functions that involve multiple steps and interactions with multiple systems.

In some embodiments, when a user issues a request to a software robot to perform a specific task, the software robot may process this request through Natural Language Processing (NLP). This technology may enable the software robot to understand and interpret the user's natural language input, transforming the verbal or written request into a format that it can act upon. The use of NLP may ensure that the software robot can engage with the user in a more intuitive and user-friendly manner, accommodating a wide variety of request styles and formats.

For example, a software robot may communicate in a natural speech manner, mimicking human conversation as closely as possible. This may enhance the user's experience, making interactions with the software robot more engaging and intuitive. It may thus serve to enhance interaction between human and automated services, offering a seamless, user-friendly interface for individuals to interact with the software robot, thereby improving acceptance and adoption of automated services within the organization.

Illustrative embodiments include decomposing a request into at least one integration-action pair. In some embodiments an integration in the integration-action pair is indicative of a configuration to operate on an execution platform in the plurality of platforms where a function is to be performed. Further, in some embodiments, an action in the integration-action pair is indicative of the function to be performed in the execution platform. An "execution platform," as used herein, may refer to a specific system or application in which a task is performed. This could be an email platform, a database, a customer relationship management (CRM) system, or any other system or application that the software robot interacts with to perform its duties. A "function," as used herein, may refer to the specific operation or function to be performed within the execution platform. Examples of actions might include creating or updating a database record, sending an email, generating a report, etc. An "integration-action pair," as used herein, may refer to a duo of components that specify an integration and an action to be performed by a software robot. It is to be understood that any other desired information may be included in an integration-action pair. In some embodiments, decomposing the request into at one or more integration-action pairs may involve performing natural language processing on the request.

The process of decomposing integration action components may be designed to distill complex requests into their simplest components: integration and action. By breaking down tasks into these fundamental parts, the system may effectively manage a large number of tasks without a corresponding increase in complexity. Each new task, no matter how complex, may be distilled into a set of manageable components, which the software robot or its subsidiary software robots can execute independently. Consider the case where a request involves making a number of API calls in a number of applications. The integration component may signify each application involved, such as email or another enterprise application. The action component, on the other hand, may indicate the specific API calls that the user would like to execute. This approach may allow the software robot to handle more complex tasks efficiently, effectively dividing them into simpler subtasks that it can perform sequentially or concurrently.

Illustrative embodiments include determining whether an integration-action pair exists in a database of integration-action pairs. A "database of integration-action pairs," as used herein, may refer to a structured set or repository of distinct units where each pair comprises an integration and an action. This database may be used to support the functioning of the software robot, enabling it to retrieve and execute tasks effectively. Determining whether an integration-action pair exists in a database of integration-action pairs may involve searching or querying the aforementioned database of integration-action pairs to identify if a specific pair is present. This step may enable the software robot to decide whether it has the necessary information to perform a requested task or whether it needs to learn a new function.

Illustrative embodiments include processing the request by the software robot. In Processing the request by the software robot may involve undertaking actions by the software robot upon receiving a request, which may include interpreting the request, determining the necessary actions, and/or executing those actions.

Illustrative embodiments include training the software robot to perform a function in a platform. For example, in some embodiments, training may be performed when the at least one integration-action pair does not exist in the database of integration-action pairs. Training the software robot to perform the particular task may involve enhancing the capabilities of the software robot by introducing it to new tasks or functions. This could involve supervised learning techniques, where the robot learns from annotated data, or it could involve reinforcement learning, where the robot learns from trial and error, or any other form of learning. Over time, this training may enable the software robot to handle a broader range of tasks and improve its performance.

In some embodiments, training the software robot to perform a particular task may include obtaining execution instructions from user actions. For example, in some embodiments, training of the software robot may utilize task mining and/or Robotic Process Automation (RPA) recording to observe the user manually executing the task. This training may allow the software robot to understand and learn a new function. As another example, if a user requests a task or function that the robot is currently not equipped to handle, an automated process may be initiated to create a new functionality. This process could involve presenting a graphical user interface to the user, enabling them to modify the software robot's functionality, such as by adding, editing, or deleting a function.

Additionally or alternatively, training could also involve leveraging machine learning algorithms that learn from new tasks or employing a low-code/no-code framework to build new capabilities. This adaptability in the software robot may allow for an expansion of its scope and versatility over time, thereby enhancing its ability to effectively assist users in a range of tasks.

Illustrative embodiments include, responsive to the training, decomposing the particular task into at least one new integration-action pair. Decomposing the particular task into at least one new integration-action pair may involve the same or similar process as decomposing the request into at least one integration-action pair, where each unit may include an integration and an action.

Illustrative embodiments include adding the at least one new integration-action pair to the database of integration-action pairs. Adding the at least one new integration-action pair to the database of integration-action pairs may involve updating the database with new pairs resulting from the decomposition of the particular task following the training. This may ensure that the database stays current and comprehensive, enhancing the software robot's ability to perform a wider array of tasks and improving the efficiency of task execution in future instances.

Illustrative embodiments include determining whether the software robot has access permission at the execution platform to perform the task. Determining whether the software robot has access to perform the particular task may involve checking whether the software robot has the necessary permissions or authorizations to carry out a specific operation or function within a system or platform.

For example, in some embodiments, the software robot may be equipped with built-in safeguards that govern its actions regarding access controls. These internal guardrails may serve as a mechanism to ensure the responsible and appropriate usage of access rights, providing an extra layer of security and accountability. In other words, even though the software robot may have service credentials and may be capable of accessing certain resources or performing certain tasks, these safeguards may ensure that it only executes actions that it is explicitly permitted to carry out.

As a non-limiting example, the software robot may be designed to implement credential validation during the execution of a task. This functionality may ensure that the software robot verifies the authenticity and appropriateness of the credentials it uses or is provided with for specific tasks. Such validation may serve to uphold the security and integrity of the system it operates within. By checking the validity of credentials prior to carrying out an action, the software robot may not only ensure its own proper functioning but also contribute to maintaining the secure and reliable operation of the overall business system.

As another example, in some embodiments, the software robot may be configured to respect and preserve the chain of command, mirroring as closely as possible the organizational hierarchy. This functionality may ensure that the software robot operates within the established protocols and respects the hierarchical structures prevalent within the organization. Whether it is seeking approvals, forwarding requests, or handling sensitive information, the software robot may be programmed to follow the same procedures and routes.

As a further example, in some embodiments, the software robot may be configured to seek validation from an individual. This feature may ensure that the software robot has the capacity to confirm or cross-check certain information, actions, or decisions with a human user as needed. The purpose of this functionality may be to maintain a high level of accuracy and accountability in the software robot's operations. Whether it is related to data accuracy, task execution, or decision-making, the software robot may initiate a validation process with a human counterpart.

Illustrative embodiments include performing intelligent exception decisioning. "Intelligent exception decisioning," as used herein, may refer to the process in which a software robot, in encountering an exception or error during task execution, utilizes an advanced decision-making process to handle the exception or error. This could involve leveraging machine learning, artificial intelligence, or pre-defined rules to determine the best course of action in response to the exception. It may include actions such as performing an alternative task, triggering an alternative workflow, requesting human approval to perform the task, performing a series of troubleshooting steps, or any other desired course of action. For example, in some embodiments, intelligent exception decisioning may take place when the software robot does not have access to perform the particular task.

In some embodiments, performing intelligent exception decisioning may include transmitting approval request for approval of an execution of the task by the software robot at the execution platform. Transmitting an approval request for approval of an execution of the task by the software robot at the execution platform may involve sending a request to a relevant authority, such as the user, the user's superior (e.g., a manager), or a system administration, and seeking approval to perform a specific task. This may occur when the task is outside of the software robot's current access permissions or if it is a new task that requires explicit consent. The transmission of the request can be through various communication channels depending on the system architecture, like email notifications, system alerts, or direct messages in a collaborative platform.

Additionally or alternatively, in some embodiments, the software robot may consult an intelligent decision table to determine override criteria, such as the context of the given task or the role of the individual making the request. This check may take place, for example, if the user does not have the necessary access to perform the request. In such a scenario, the software robot may leverage decision-making algorithms to evaluate whether there are sufficient grounds to override the access restrictions. The intelligent decision table may hold various conditions and corresponding actions, and it may employ artificial intelligence techniques to adapt and learn from historical data, improving decision-making over time. Such a decision table can take various factors into account, such as the urgency of the task, the potential impact of not performing the task, or the trust level associated with the user, among other factors. This feature may provide the software robot with the capacity to respond flexibly to complex situations, while still maintaining a high level of security and compliance.

The override criteria may correspond to specific conditions or rules that, when met, allow for the usual processes or access controls to be bypassed or altered. Override criteria may be employed to deal with exceptional circumstances or to allow for greater flexibility in system operation. Reviewing an intelligent decision table to determine override criteria may involve consulting the intelligent decision table in order to ascertain which conditions or rules would permit the usual operational procedures or access controls to be overridden.

Illustrative embodiments include granting access to a service credential level of a user to the software robot. Granting access to a service credential level of a user to the software robot may involve authorizing a software robot to access or utilize the access permissions or authorizations of a user. This could enable the software robot to perform tasks on behalf of the user within a system or application.

For example, in some embodiments, the user may have the option to opt-in to allow access to the software robot, thereby granting it access to the user's service credential level. The access granted to the software robot to service credential level may allow it to operate with a higher degree of functionality and efficiency, that is, the same level of authorization as the user. It may enable the software robot to perform a wider range of tasks and interact more effectively with other systems or modules, potentially improving the overall efficacy of the automated processes within the business environment.

Illustrative embodiments include determining whether the user has access permission at the execution platform to perform the task. Determining whether the user has access permission at the execution platform to perform the task may involve verifying if a user has the necessary permissions or authorizations to execute a certain operation or function within a system or application.

For example, in some embodiments, upon receiving a request from the user, the software robot may utilize its service credentials to verify if the user querying the software robot has the necessary access to manually execute this request (e.g., a specific task, API call, or integration). This security measure may ensure that the software robot only performs actions that the user is authorized to carry out, maintaining the integrity and security of the systems with which it interacts.

In some embodiments, if the user does indeed have the necessary access, the software robot may proceed to execute the requested action based on the user's access permissions. This may mean that the software robot may replicate the user's actions within the scope of their permissions, carrying out the tasks that the user has both requested and is authorized to perform. This may maintain the congruity between user permissions and software robot actions, ensuring that the software robot acts as an accurate extension of the user.

Illustrative embodiments include determining whether another software robot has access permission at the execution platform to perform the task, and transmitting an inter-software robot request from the software robot to another software robot to perform the task. An "inter-software robot request," as used herein, may refer to a request that is sent from one software robot to another. This may occur when one software robot requires the assistance of another to complete a task, or when tasks are distributed among multiple software robots. Determining whether another software robot has access permission at the execution platform to perform the task may involve verifying if a different software robot has the requisite permissions or authorizations to execute a certain operation or function within a system or application.

For example, if a member of a company team wants to be added to a Robotic Process Automation (RPA) system, the member may interact with a software robot, say "Zach's software robot," to get access. Rather than directly granting the access, Zach's software robot may initiate a dialogue with another software robot responsible for managing access permissions. This inter-software robot dialogue may enhance the potential for advanced collaboration and coordination among software robots, moving beyond the traditional paradigm of isolated software robot tasks. This capability may also improve the scalability of software robot operations, allowing for a more streamlined and effective response to user requests.

Illustrative embodiments include receiving an approval of an execution of a task, and receiving access to a second service credential level of a second user for the task. Approving an execution of the particular task by the software robot may involve authorizing the software robot to perform a certain operation or function. This approval could come from a user, another software robot, a system authority, or any other entity. Receiving by the software robot second service credential level of a second user for the task may involve giving another user the ability to use or control the software robot for a specific operation or function. This may allow the other user to utilize the software robot's capabilities to perform the task.

For example, in some embodiments, once the task has been approved and access granted, the software robot may replace the user's credentials with its own service credentials to perform the task. This replacement of credentials, following the necessary approvals, may allow the software robot to perform the task autonomously, freeing up the user to focus on other tasks. Once the software robot is set up and deployed in this manner, it may become available for others to use. The ability to take over tasks from users not only enhances operational efficiency but also empowers users by giving them the tools to automate their workflow.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The process software including the software robot orchestrating software is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

With reference to FIG. 1, this figure depicts a block diagram of a computing environment 100. Computing environment 100 contains an example of an environment for the execution of at least some of the computer code involved in performing the inventive methods, such as software robot orchestration engine 200 for managing software robots. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

With reference to FIG. 2, this figure depicts a block diagram of an example software integration process 200, which various illustrative embodiments may implement. Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

With reference to FIG. 3, this figure depicts a block diagram of an example software robot 300, which various illustrative embodiments may implement. It is to be understood that the software robot 300 may be implemented as a single unit or as a part of a larger system in which computer-usable program code or instructions implementing the processes may be located for the illustrative embodiments. In addition, a software robot may comprise multiple software robots integrated into a single unit or functioning separately.

In the depicted example, software robot 300 employs an architecture which includes a user interface (UI) component 302, a core functionality component 304, a storage unit 306, a communication unit 308, a security unit 310, and an integration unit 312. User interface component 302 may act as the interface between the software robot and its users. It may allow for interaction and controls to be executed, providing visual feedback and data to the user.

Core functionality component 304 may contain the main functionality of the software robot, including various operations and actions it can perform, including illustrative embodiments described herein. It may include a range of processors, servers, or other computing entities to carry out these functions. For instance, the core functionality component could include a data processing unit that handles data analysis, manipulation, and other data-related tasks, and a decision-making unit that allows the robot to make intelligent decisions based on predefined algorithms or machine learning models.

Storage unit 306 may serve as the memory for the software robot, storing data, learned models, user preferences, and any other relevant information. It may be used for retaining data between sessions and allowing the software robot to learn from previous actions.

Communication unit 308 may allow the software robot to interact with external systems, databases, or other software. This component may allow the robot to retrieve or send data, call APIs, or execute other forms of communication necessary for its operations.

Security unit 310 may be used to ensure the privacy and safety of data being handled by the software robot. It may ensure that interactions and data storage meet the required security standards, protecting against unauthorized access or breaches.

Integration unit 312 may allow the software robot to integrate with other systems, software, or devices. It may include modules for various APIs, data formats, or communication protocols, allowing the robot to work in harmony with a range of external entities.

Instructions for the software robot's operations, including its core functionality, data processing, decision-making, and communication tasks, may be stored in storage unit 306 and may be executed by core functionality component 304. The processes of the illustrative embodiments may be performed by core functionality component 304 using computer implemented instructions, which may be located in the storage unit 306 or in one or more peripheral devices.

With reference to FIG. 4, this figure depicts a block diagram of an example process for orchestration of software robots in accordance with an illustrative embodiment 400. The example block diagram of FIG. 4 may be implemented using software robot orchestration engine 200 of FIG. 1.

In the illustrative embodiment, at block 402, the user may grant access to a software robot. This process may involve the user sharing specific permissions or credentials that enable the software robot to carry out its tasks. Providing this access may necessitate interaction with security protocols or frameworks in place to safeguard data and systems integrity.

At block 404, the software robot may be installed in a centralized or decentralized manner. The installation process may differ depending on organizational needs, technological infrastructure, or specific operational considerations. A centralized installation may involve housing the software robot on a single server or a specific set of servers from which it can be accessed across the organization. On the other hand, a decentralized installation may involve deploying the software robot across a network of devices or systems, enhancing accessibility and reducing reliance on a single point of operation.

At block 406, the software robot may connect to core business functionality. This may involve establishing links between the robot and the systems or platforms associated with the business's operations. This connection process may necessitate configuring the robot to understand and interact with these systems. Depending on the nature of the business, this may include connections to financial systems, customer relationship management platforms, inventory management systems, or any other operational platforms. Through these connections, the software robot may become a functional component of the business ecosystem, contributing to the overall operational efficiency.

For example, as shown in block 408, the software robot may connect to a collaborative software. This stage of the process may enable the software robot to engage with software tools that facilitate collaborative efforts within the organization. Such collaborative software may include communication platforms like Slack, Microsoft Teams, or project management tools like Trello or Asana. Establishing these connections may enable the software robot to participate in collaborative processes, enhancing communication flow and assisting in tasks that facilitate teamwork and coordination.

Additionally or alternatively, as shown in block 410, the software robot may connect to a functional software. This may involve establishing connections between the software robot and functional applications or tools. Depending on the nature of the tasks that the robot is intended to automate, this may include software for data analysis, resource planning, content creation, or any other functional area. Establishing these connections may enable the robot to contribute more effectively to the operational flow of the business.

At block 412, the user may query the software robot. This may involve the user communicating directly with the robot, issuing commands or making requests for specific tasks to be completed. These queries can take a variety of forms depending on the robot's capabilities and the user's needs.

For example, as shown in block 412, the user may query the software robot via collaborative or functional software. This may extend the user's interaction with the robot into the digital spaces where much of the organization's activity takes place. It may involve the user issuing commands or requests through platforms like email, instant messaging, or other collaborative tools, or even through specific functional software connected to the robot.

At block 414, the software robot may process the user's request. This may involve understanding the specifics of the task the user desires to be performed and translating it into a form that the software robot can interpret and/or implement. The request may include various components such as the particular action the user wants to be executed and the system or platform on which this action should be performed. In this stage, the software robot may also have to comprehend nuances in the user's request which could involve complex natural language processing algorithms and machine learning techniques. In some embodiments, this step may involve the robot using NLP algorithms. The application of NLP may allow the robot to interpret human language in a way that is both contextually and grammatically appropriate.

At block 416, the software robot may compare the user's request to known action templates. An "action template," as used herein, may refer to a preset framework for an action that a software robot can perform. This template may outline the necessary steps and parameters for the action, allowing the robot to follow it when executing the corresponding task. These templates may serve as pre-defined patterns or formats for various tasks that the software robot is equipped to handle. This comparison may involve various matching algorithms and could be based on a variety of parameters depending on the complexity and versatility of the software robot.

Once the comparison is done, the procedure diverges based on whether a match is found or not. If the user's request matches an action template, as shown in block 418, the software robot then proceeds to execute the task associated with the user's request. This is illustrated in block 420. The execution of the task may involve interacting with various systems or platforms as specified in the user's request. It may require the software robot to execute specific API calls or perform specific actions on a platform, as per the user's request.

However, if the user's request does not match any existing action templates, as outlined in block 420, the software robot then proceeds to a training phase to perform the task associated with the user's request. This is shown in block 422. In this stage, the software robot may be trained to understand and execute the new task as per the user's request. This could involve task mining, process mining, RPA recording, or using machine learning techniques to expand the software robot's capabilities, as further explained herein.

Figure 5:
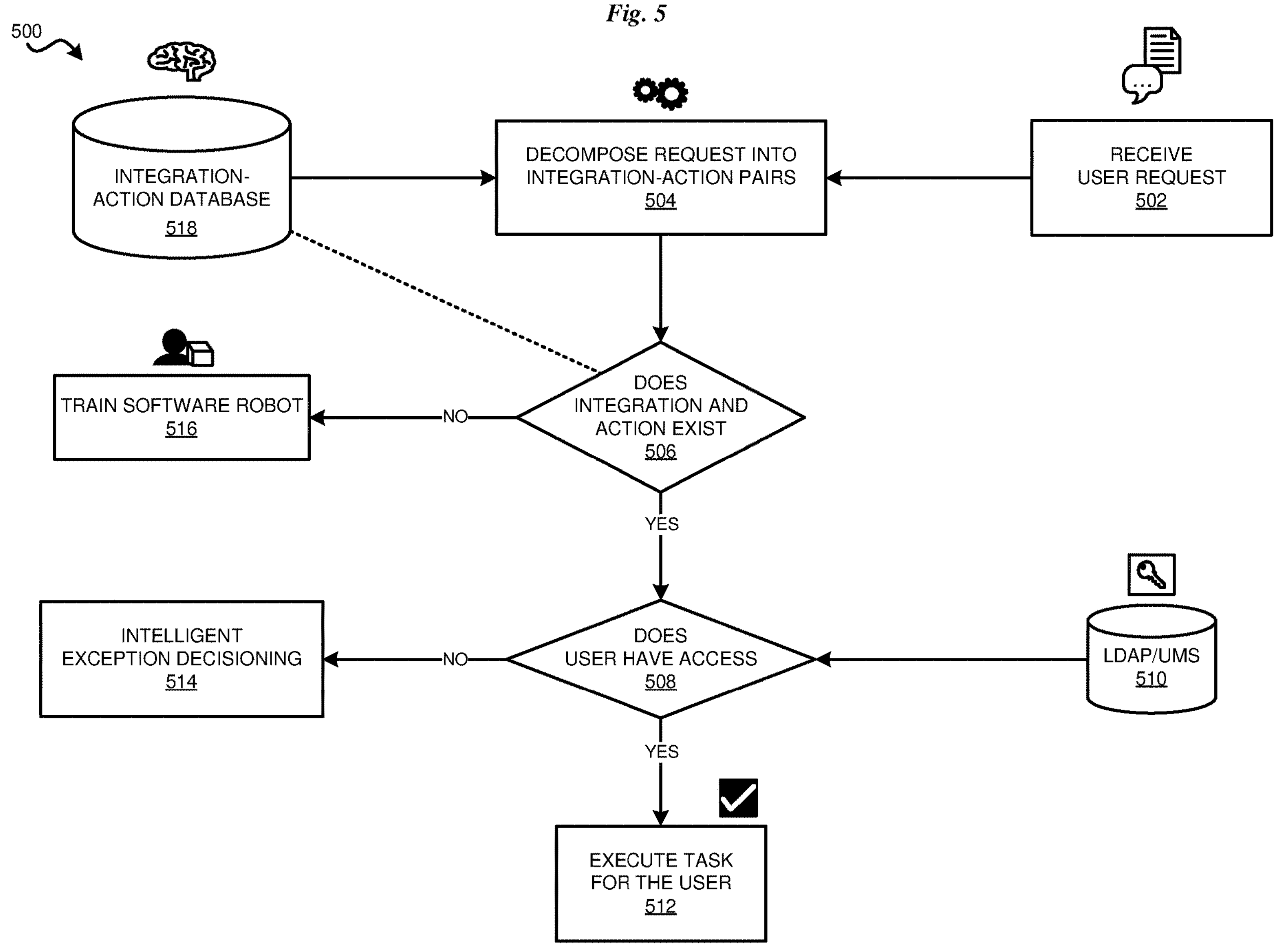
FIG. 5 depicts a block diagram of an example process for executing a user request by a software robot in accordance with an illustrative embodiment.

With reference to FIG. 5, this figure depicts a block diagram of an example process for executing a user request by a software robot in accordance with an illustrative embodiment 500. The example block diagram of FIG. 5 may be implemented using software robot orchestration engine 200 of FIG. 1.

In the illustrative embodiment, at block 502, the software robot may receive a user request. This step may involve the software robot receiving an electronic message or transmission, which can be transmitted through diverse channels such as collaborative platforms, encompassing services like Slack, email, and more. This user request could pertain to a wide variety of tasks, ranging from simple queries to more complex commands that call for specific actions.

At block 504, the software robot may decompose the user request into integration-action pairs. Decomposing may involve analyzing and breaking down a piece of information into its constituent parts for easier processing. In this case, the software robot may analyze the user's request and separate it into two distinct categories: integration, which may indicate an execution platform where a function is to be performed; and action, which may indicate the function to be performed in the execution platform. This separation may allow for more efficient processing of the request.

At block 506, the software robot may determine whether the integration-action pairs exist, such as by checking whether they exist in database 518. This may involve the software robot validating the user's request against a predefined list of available integrations and actions. This step may be used to ensure that the robot effectively carries out tasks within its defined abilities and knowledge base.

At block 508, if the integration-action pairs exist, the software robot may check whether the user has proper access to perform the task. This step may involve verifying the user's permissions or access rights to ensure they have the authority to request the specified action on the given platform. It may be used to ensure that user permissions are respected, such as in environments where different roles or positions have varying levels of access to systems and tasks.

At block 510, the software robot may retrieve information from an authentication and authorization service, such as a Lightweight Directory Access Protocol (LDAP) or User Management System (UMS), to determine whether the user has proper access to perform the task. This may involve the software robot interacting with security and user management systems like LDAP or UMS to verify user permissions. These systems may contain information about the user's access rights and roles, enabling the software robot to confirm if the user is indeed authorized to perform the requested action on the specified system. By cross-checking user details with these services, the software robot may maintain the integrity of system permissions and ensure the correct application of user rights. At block 512, if the user has proper access, the process may execute the task for the user.

At block 514, if the user does not have proper permissions, the software robot may perform intelligent exception decisioning. This step may involve leveraging machine learning, artificial intelligence, or pre-defined rules to determine the best course of action in response to the exception. It may include actions such as triggering an alternative workflow, asking for human approval or intervention, performing a series of troubleshooting steps, or any other desired course of action.

At block 516, if the integration and action do not exist, the software robot may be trained perform the task. In this stage, the software robot may be trained to understand and execute the new task as per the user's request. This could involve task mining, process mining, RPA recording, or using machine learning techniques to expand the software robot's capabilities, as further explained herein.

Figure 6:
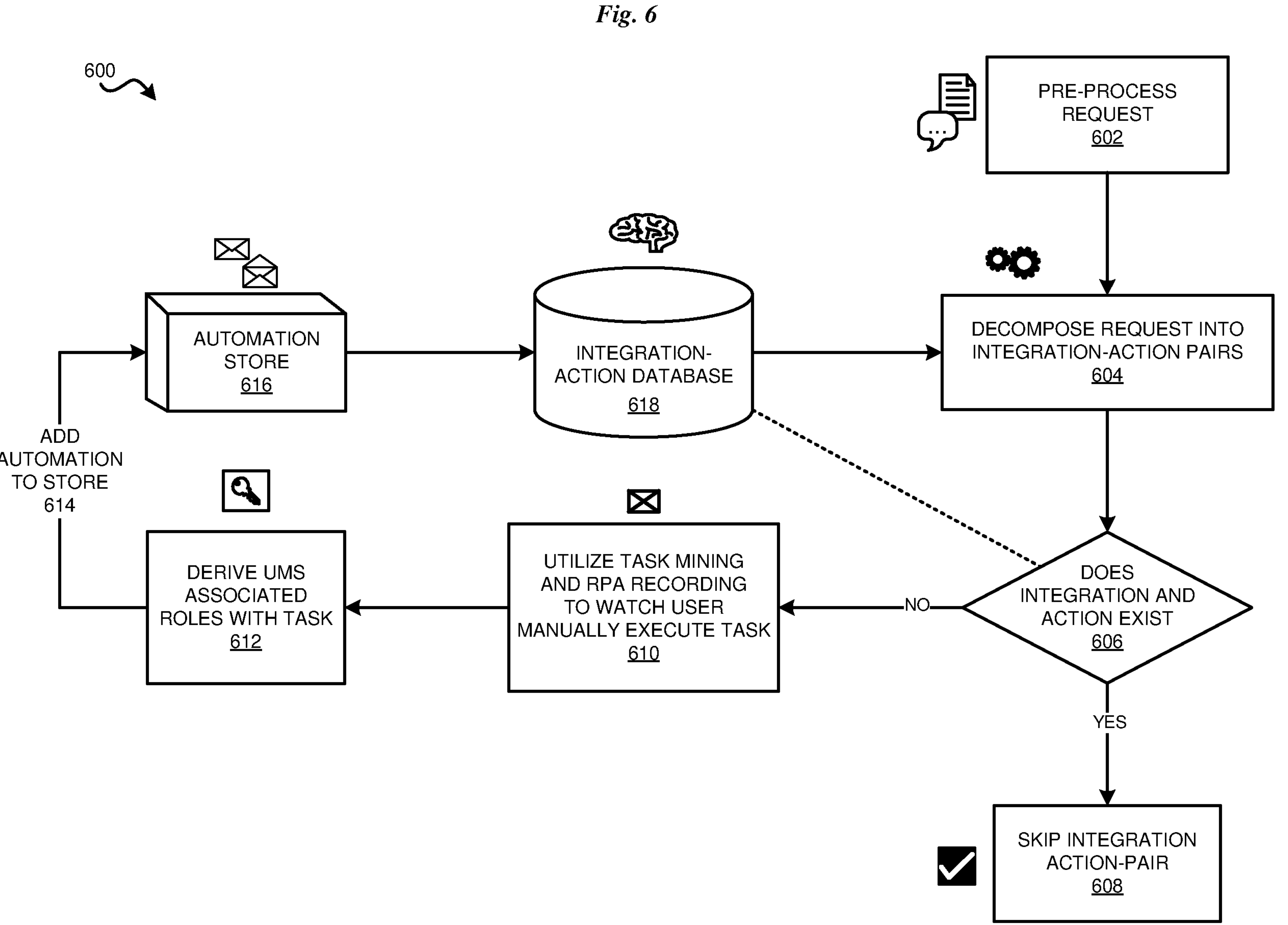
FIG. 6 depicts a block diagram of an example process for training a software robot in accordance with an illustrative embodiment.

With reference to FIG. 6, this figure depicts a block diagram of an example process for training a software robot in accordance with an illustrative embodiment 600. The example block diagram of FIG. 6 may be implemented using software robot orchestration engine 200 of FIG. 1.

In the illustrative embodiment at block 602, the process may pre-process a request. During pre-processing, the software robot may undertake an initial analysis and preparation of the user's request. This pre-processing stage may format the request in a way that it can be further dissected and understood by the software robot in subsequent stages, allowing it to accurately respond to or perform the task as requested by the user. This could involve a variety of tasks such as normalizing the text input, rectifying any spelling or grammar errors, understanding the context or sentiment of the request, and identifying key components or terms within the request.

At block 604, the process may decompose the processed request into integration-action pairs. As previously explained, at this step the software robot may analyze the user's request and separate it into two distinct categories: integration, which may indicate an execution platform where a function is to be performed; and action, which may indicate the function to be performed in the execution platform.

At block 606, the process may determine whether the integration-action pairs exist, such as by checking whether they exist in database 618. If the integration-action pair exists, the process may skip the existing integration-action pair as shown in block 608. In such a case, the process may proceed to train the software robot with integration-action pairs that do not exist.

At block 610, if the integration and action do not exist, the process may train the software robot to perform the task. For example, as shown in the illustrative embodiment, the process may utilize task mining and/or RPA recording to watch the user manually execute the task. Other ways of training the software robot may be used, however. For example, the software robot could be trained through supervised learning, where it learns from a labeled dataset; or through reinforcement learning, where it improves its decision-making ability over time through a system of rewards and penalties. Another approach could involve transfer learning, where the software robot adapts the knowledge gained from one task to a similar but distinct task. Interactive training, where a human trainer provides real-time feedback to the software robot, could also be utilized. The software robot could learn from imitation, observing and replicating the actions of a human expert, or through inverse reinforcement learning, where it infers the goals and strategy from observed actions. Active learning could also be employed, in which the software robot interacts with its environment or with a human expert, selectively asking for inputs or feedback. Furthermore, the software robot could also be trained through unsupervised learning, where it identifies patterns in a dataset without pre-labeled instances. One or more of these training methods may be used, depending on the applicable system or application.

At block 612, the process may derive user-associated roles associated with the task, such as by deriving UMS-associated roles. This process may involve the software robot using UMS data or a similar source to infer the roles associated with the user making the request or the task to be performed. For example, a user in a managerial role might need access to approve requests or view high-level reports. In such scenario, the software robot may use this access in subsequent executions of the task.

At block 614, the process may add an automation resulting from the trained task to a store of automations. This step may involve the use of a specific repository or database, such as automation store 616, for storing automations the software robot can perform. By storing and categorizing the automations in a structured manner, the software robot may quickly reference and execute them when similar user requests are made in the future.

Moreover, the trained task may be broken down into one or more integration-action pairs and stored in a database of known integration and actions, such as integration-action database 618. This process may involve decomposing the new trained task into distinct units of integration and actions, which can be readily accessed and reused. By storing these components in a database of known integrations and actions, the software robot can easily reconstruct similar tasks in the future or adapt them to handle new requests. It is to be understood that steps may be skipped, modified, or repeated in the illustrative embodiment. Moreover, the order of the blocks shown is not intended to require the blocks to be performed in the order shown, or any particular order.

With reference to FIG. 7, this figure depicts a block diagram of an example process for orchestration of software robots in accordance with an illustrative embodiment 700. The example block diagram of FIG. 7 may be implemented using software robot orchestration engine 200 of FIG. 1.

In the illustrative embodiment, at block 702, the process configures a software robot to operate in collaboration with a plurality of platforms in a work environment. At block 704, the process decomposes a request to perform a task received from a platform in the plurality of platforms, into at least one integration-action pair. In some embodiments, an integration in the integration-action pair is indicative of a configuration to operate on an execution platform in the plurality of platforms where a function is to be performed, and an action in the integration-action pair is indicative of the function to be performed in the execution platform. At block 706, the process trains the software robot to perform the function in the platform, the function causing a performance of the task at the platform. It is to be understood that steps may be skipped, modified, or repeated in the illustrative embodiment. Moreover, the order of the blocks shown is not intended to require the blocks to be performed in the order shown, or any particular order.

Figure 8B:
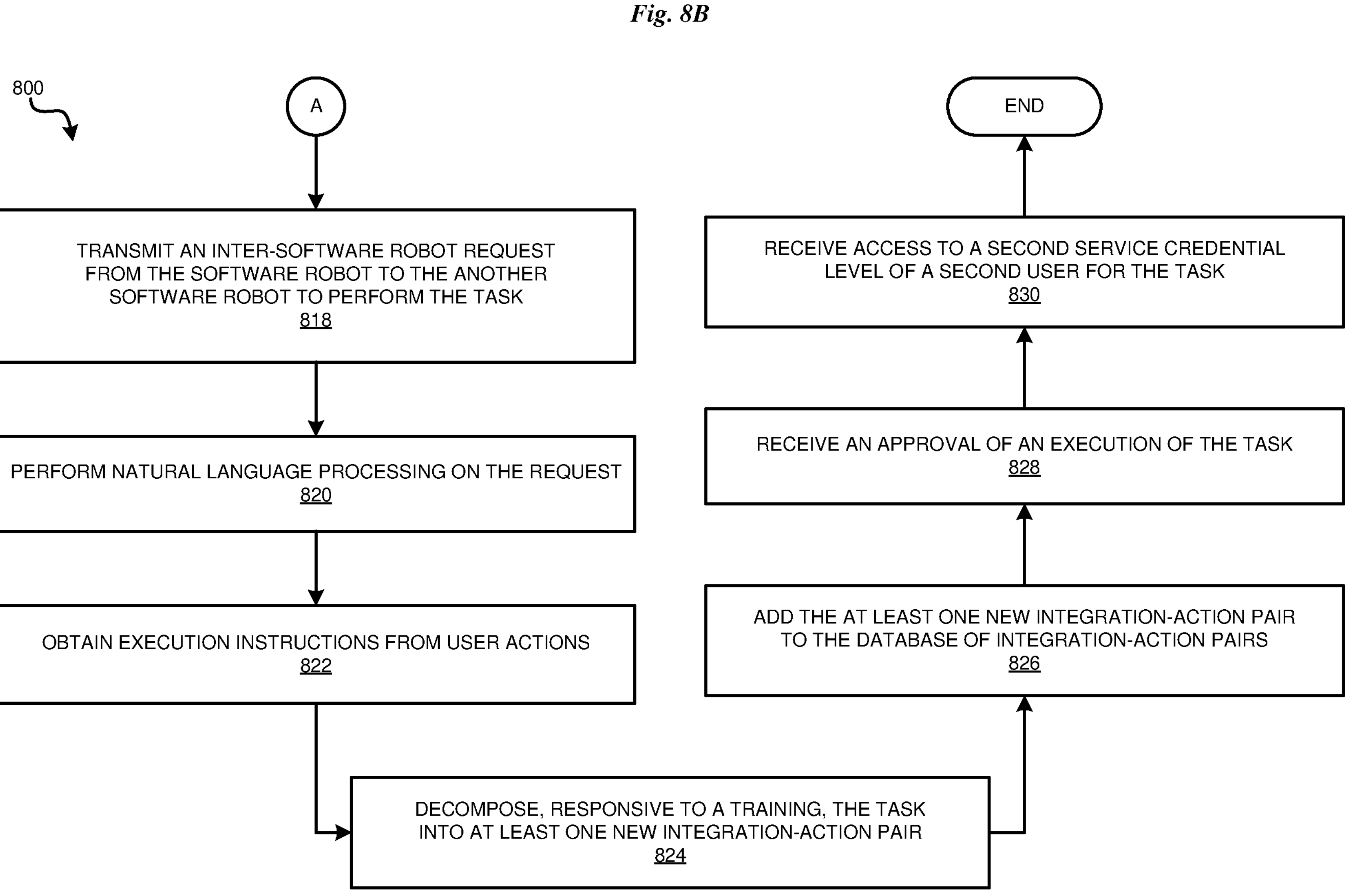
FIG. 8B depicts a block diagram of an example process for orchestration of software robots in accordance with an illustrative embodiment.

With reference to FIGS. 8A-8B, this figure depicts a block diagram of an example process for orchestration of software robots in accordance with an illustrative embodiment 800. The example block diagram of FIGS. 8A-8B may be implemented using software robot orchestration engine 200 of FIG. 1.

In the illustrative embodiment, at block 802, the process determines that the software robot lacks access permission at the execution platform to perform the task. At block 804, the process performs, by the software robot, intelligent exception decisioning for requesting human approval to perform the task. At block 806, the process transmits an approval request for approval of an execution of the task by the software robot at the execution platform. At block 808, the process receives access to a service credential level of a user. At block 810, the process determines that the at least one integration-action pair exists in the database of integration-action pairs. At block 812, the process determines that the user has access permission at the execution platform to perform the task. At block 814, the process performs, by the software robot, the task at the platform. At block 816, the process determines that another software robot has access permission at the execution platform to perform the task. At block 818, the process transmits an inter-software robot request from the software robot to the another software robot to perform the task. At block 820, the process performs natural language processing on the request. At block 822, the process obtains execution instructions from user actions. At block 824, the process decomposes, responsive to a training, the task into at least one new integration-action pair. At block 826, the process adds the at least one new integration-action pair to the database of integration-action pairs. At block 828, the process receives an approval of an execution of the task. Finally, at block 830, the process receives access to a second service credential level of a second user for the task. It is to be understood that steps may be skipped, modified, or repeated in the illustrative embodiment. Moreover, the order of the blocks shown is not intended to require the blocks to be performed in the order shown, or any particular order.

The following definitions and abbreviations are to be used for the interpretation of the claims and the specification. As used herein, the terms "comprises," "comprising." "includes," "including." "has," "having." "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment." "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about." "substantially," "approximately." and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

configuring a software robot to operate in collaboration with a plurality of platforms in a work environment;

decomposing, at the software robot, a request to perform a task received from a platform in the plurality of platforms, into at least one integration-action pair, wherein an integration in the integration-action pair is indicative of a configuration to operate on an execution platform in the plurality of platforms where a function is to be performed, and an action in the integration-action pair is indicative of the function to be performed in the execution platform;

training, responsive to a determination that the at least one integration-action pair does not exist in a database of integration-action pairs, the software robot to perform the function in the platform, the function causing a performance of the task at the platform, wherein the training comprises causing the software robot to perform a task mining operation wherein the robot (i) observes a manual execution of the task comprising the action, and (ii) replicates the action; and performing by the software robot, responsive to determining that the software robot lacks access permission at the execution platform to perform the task at the execution platform to perform the task, intelligent exception decisioning for performing an alternative task.

2. The method of claim 1, wherein the performing the intelligent exception decisioning comprises:

transmitting, from the software robot to a manager of a user associated with the request, an approval request for approval of an execution of the task by the software robot at the execution platform.

3. The method of claim 1, further comprising:

receiving, by the software robot, access to a service credential level of a user; and performing by the software robot the task at the platform, responsive to a determination that the at least one integration-action pair exists in the database of integration-action pairs and a determination that the user has access permission at the execution platform to perform the task.

4. The method of claim 1, further comprising:

transmitting, responsive to a determination that another software robot has access permission at the execution platform to perform the task, an inter-software robot request from the software robot to the another software robot to perform the task.

5. The method of claim 1, wherein decomposing the request into at least one integration-action pair involves performing natural language processing on the request.

6. The method of claim 1, wherein training the software robot to perform the task includes obtaining execution instructions from user actions.

7. The method of claim 1, further comprising:

decomposing, responsive to the training, the task into at least one new integration-action pair; and adding the at least one new integration-action pair to the database of integration-action pairs.

8. The method of claim 1, further comprising:

receiving by the software robot, responsive to an approval of an execution of the task, access to a second service credential level of a second user for the task.

9. A computer program product comprising one or more computer readable storage media, and program instructions collectively stored on the one or more computer readable storage media, the program instructions executable by a processor to cause the processor to perform operations comprising:

configuring a software robot to operate in collaboration with a plurality of platforms in a work environment;

decomposing, at the software robot, a request to perform a task received from a platform in the plurality of platforms, into at least one integration-action pair, wherein an integration in the integration-action pair is indicative of a configuration to operate on an execution platform in the plurality of platforms where a function is to be performed, and an action in the integration-action pair is indicative of the function to be performed in the execution platform;

training, responsive to a determination that the at least one integration-action pair does not exist in a database of integration-action pairs, the software robot to perform the function in the platform, the function causing a performance of the task at the platform, wherein the training comprises causing the software robot to perform a task mining operation wherein the robot (i) observes a manual execution of the task comprising the action, and (ii) replicates the action; and performing by the software robot, responsive to determining that the software robot lacks access permission at the execution platform to perform the task at the execution platform to perform the task, intelligent exception decisioning for performing an alternative task.

10. The computer program product of claim 9, wherein the performing the intelligent exception decisioning comprises:

transmitting, from the software robot to a manager of a user associated with the request, an approval request for approval of an execution of the task by the software robot at the execution platform.

11. The computer program product of claim 9, further comprising:

receiving, by the software robot, access to a service credential level of a user; and performing by the software robot the task at the platform, responsive to a determination that the at least one integration-action pair exists in the database of integration-action pairs and a determination that the user has access permission at the execution platform to perform the task.

12. The computer program product of claim 9, further comprising:

transmitting, responsive to a determination that another software robot has access permission at the execution platform to perform the task, an inter-software robot request from the software robot to the another software robot to perform the task.

13. The computer program product of claim 9, wherein decomposing the request into at least one integration-action pair involves performing natural language processing on the request.

14. A computer system comprising a processor and one or more computer readable storage media, and program instructions collectively stored on the one or more computer readable storage media, the program instructions executable by the processor to cause the processor to perform operations comprising:

configuring a software robot to operate in collaboration with a plurality of platforms in a work environment;

decomposing, at the software robot, a request to perform a task received from a platform in the plurality of platforms, into at least one integration-action pair, wherein an integration in the integration-action pair is indicative of a configuration to operate on an execution platform in the plurality of platforms where a function is to be performed, and an action in the integration-action pair is indicative of the function to be performed in the execution platform;

training, responsive to a determination that the at least one integration-action pair does not exist in a database of integration-action pairs, the software robot to perform the function in the platform, the function causing a performance of the task at the platform, wherein the training comprises causing the software robot to perform a task mining operation wherein the robot (i) observes a manual execution of the task comprising the action, and (ii) replicates the action; and performing by the software robot, responsive to determining that the software robot lacks access permission at the execution platform to perform the task at the execution platform to perform the task, intelligent exception decisioning for performing an alternative task.

15. The computer system of claim 14, wherein the performing the intelligent exception decisioning comprises:

transmitting, from the software robot to a manager of a user associated with the request, an approval request for approval of an execution of the task by the software robot at the execution platform.

16. The computer system of claim 14, further comprising:

receiving, by the software robot, access to a service credential level of a user; and performing by the software robot the task at the platform, responsive to a determination that the at least one integration-action pair exists in the database of integration-action pairs and a determination that the user has access permission at the execution platform to perform the task.

17. The computer system of claim 14, further comprising:

transmitting, responsive to a determination that another software robot has access permission at the execution platform to perform the task, an inter-software robot request from the software robot to the another software robot to perform the task.

* * * * *